United States Patent

Lystad

[15] 3,703,310

[45] Nov. 21, 1972

[54] DUAL CONFIGURATION VEHICLE BODY

[72] Inventor: Leonard A. Lystad, Warren, Mich.

[73] Assignee: General Motors Corporation, Detroit, Mich.

[22] Filed: June 1, 1971

[21] Appl. No.: 148,777

[52] U.S. Cl. .................................... 296/10, 296/66
[51] Int. Cl. ............................................. B60p 3/42
[58] Field of Search ............... 296/10, 63, 65, 66, 69

[56] References Cited

UNITED STATES PATENTS 3,292,970  12/1966  Wilson ......................... 296/66
3,390,913  7/1968  Hunter ......................... 296/10

*Primary Examiner*—Philip Goodman
*Attorney*—W. E. Finken and D. L. Ellis

[57] ABSTRACT

A primary vehicle body member having an open cargo compartment and a forward passenger cab with an open side adjoining the cargo compartment is adapted for conversion from the open configuration to a closed configuration by the installation of a removable secondary body member over the cargo compartment. A rear seat structure in the primary body member includes a seat back which is supported on the primary body member for pivotal movement between a retracted position wherein it cooperates with a seat base in comfortably supporting passengers and an extended position wherein it closes the lower portion of the open adjoining side of the cab. A partition is supported on the seat back for pivotal movement from a lowered position to a raised position above the seat back so that in the extended position of the seat back the latter cooperates with the partition in completely closing the adjoining side of the cab to thus insure the comfort of passengers in the cab when the secondary body member is removed.

4 Claims, 3 Drawing Figures

PATENTED NOV 21 1972  3,703,310

INVENTOR.
Leonard A. Lystad
BY
D. L. Ellis
ATTORNEY

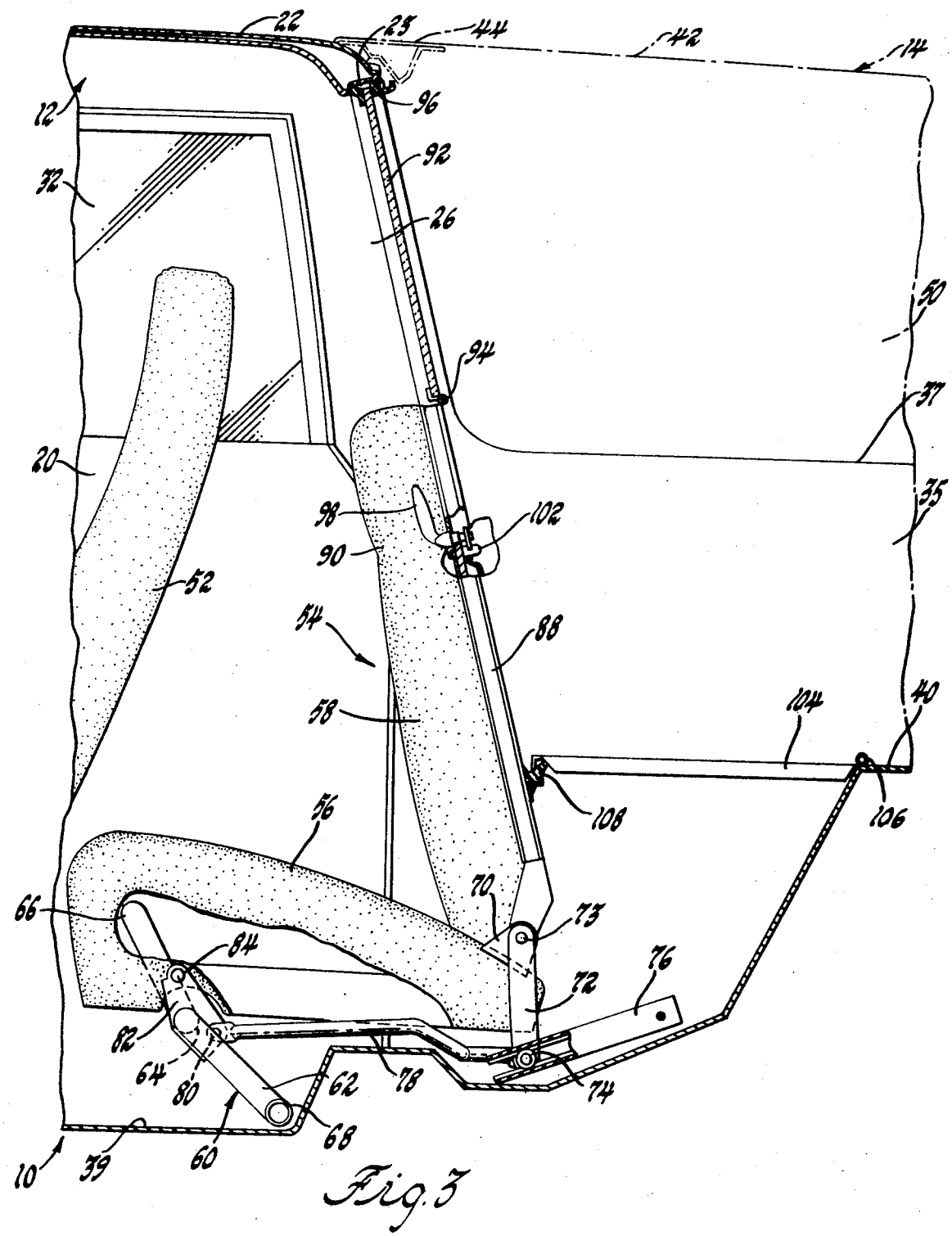

DUAL CONFIGURATION VEHICLE BODY

This invention relates generally to vehicle bodies and in particular to a vehicle body which is adapted for conversion between a closed passenger carrying configuration and an open cargo carrying configuration.

Conventional station wagon type vehicle bodies are commercially popular because they combine into a single unit both passenger and substantial cargo carrying capabilities. The cargo carrying capability is limited, however, by the fixed roof which encloses the conventional rear cargo area of the vehicle body. Pick-up truck type vehicle bodies, on the other hand, provide a closed passenger carrying compartment or cab and an open cargo carrying compartment to thereby expand the cargo carrying capability of the vehicle. Pick-up truck type bodies, however, lack the pleasing styling features of station wagon type bodies and are, therefore, not particularly suitable for general use. A vehicle body according to this invention represents an advance in vehicle body design in that it provides a body which is easily convertible from a closed station wagon type configuration suitable for general use into an open pick-up truck type configuration adapted for more specialized applications.

Accordingly, the primary feature of this invention is that it provides a new and improved vehicle body adapted for conversion between a closed configuration and an open configuration. Another feature of this invention is that it provides a new and improved vehicle body including a primary body member, a removable secondary body member, and front and rear passenger seat structures, the rear seat structure accommodating passengers in the closed body configuration when the secondary body member is attached to the main body member and converting into a cab rear bulkhead behind the front seat structure in the open body configuration when the secondary body member is removed to expose a cargo compartment of the main body member. Yet another feature of this invention resides in the provision of a rear seat structure including a cushion back member which is movable from a rearwardly inclined passenger seating position in the closed body configuration to a forwardly inclined position between a pair of rigid body pillars in the open body configuration defining the lower portion of a weather-tight bulkhead, the back member supporting thereon a partition, preferably transparent, for movement between a lowered position and a raised position defining the upper portion of the weather-tight bulkhead. A still further feature of this invention resides in the provision of cover means supported on the main body member and adapted to protectively conceal the partition when the seat back is in the rearwardly inclined seating position and to effect continuity of the cargo floor to the bulkhead when the seat back is in the forwardly inclined position.

These and other features of this invention will be readily apparent from the following specification and from the drawings wherein:

FIG. 3 is a view similar to FIG. 2 but showing the rear seat structure in the position thereof corresponding to the open configuration of the vehicle body.

Figure 1:
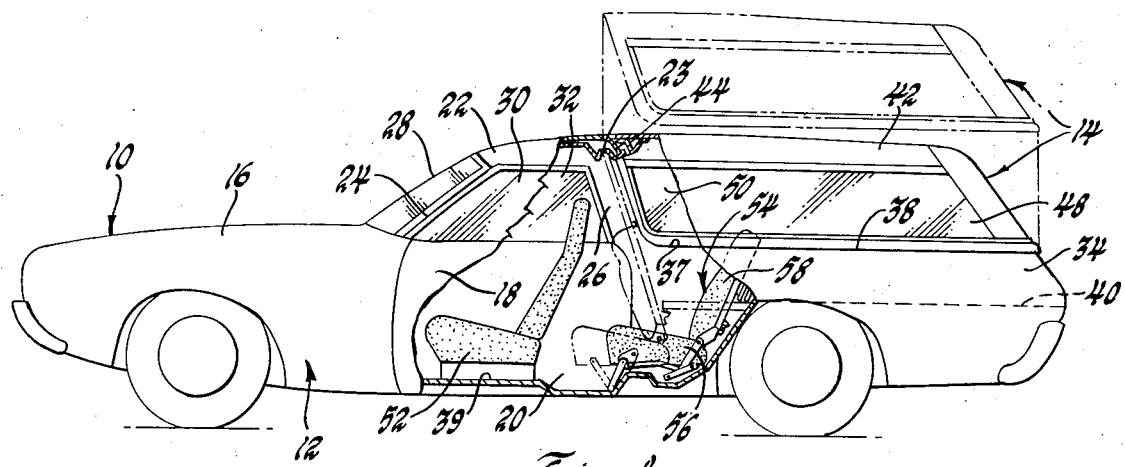
FIG. 1 is a partially broken away side elevational view of a vehicle body according to this invention.

Referring now to FIG. 1 of the drawings, there is shown a vehicle body designated generally 10 including a primary body member 12 and a secondary body member 14. The primary body member 12 is divided generally into front and rear portions, the front portion including a pair of transversely spaced front fenders, only left front fender 16 being shown in FIG. 1, a left vertically hinged door 18, and a right vertically hinged door 20. A foreshortened roof structure 22 having a downwardly facing rear margin 23 is rigidly supported above the doors by a pair of laterally spaced front body pillars, only left front pillar 24 being shown, and by a pair of laterally spaced rear body pillars, only right rear pillar 26 being shown in FIGS. 1, 2 and 3. The roof structure and front body pillars cooperate in sealingly supporting a windshield 28 while respective ones of the rear body pillars cooperate with the roof structure and a corresponding one of the front body pillars in defining openings above the doors 18 and 20 adapted for closure by a pair of vertically movable windows 30 and 32.

The rear portion of the primary body member 12 includes a pair of laterally spaced left and right quarter panel structures 34 and 35 which extend rearwardly from behind the doors 18 and 20 and below the rear body pillars and which terminate vertically in a pair of coplanar longitudinal bearing surfaces 37 and 38. A floor panel 39 extends rearwardly from the vehicle firewall, not shown, in the front portion of the primary body member, below the doors 18 and 20, and into the rear portion of the primary body member between the quarter panel structures where it terminates at the leading edge of a rigid cargo floor 40. The cargo floor is oriented generally horizontally and fills the space between the quarter panel structures, the quarter panel structures cooperating with the cargo floor and a lateral closure, not shown, extending between the rear extremities of the quarter panel structures in defining an open cargo carrying compartment. The lateral closure may be rigidly attached to the quarter panel structures or, preferably, may be supported for conventional drop-gate type tailgate operation to facilitate transfer of cargo into or out of the cargo compartment.

As best seen in FIG. 1, the secondary body member 14 is essentially a canopy adapted to be removably secured to the primary body member over the rear portion thereof, the configuration of the secondary body member being such that continuity of appearance across the roof structure 22 and above the quarter panel structures is maintained when the secondary body member is installed. The secondary body member includes a top panel 42 having a lateral header portion 44, a pair of vertical longitudinally extending side panels 48 and 50 preferably having windows therein, and a lateral back panel, not shown, between the side panels. The back panel may, of course, be a rigid portion of the secondary body member or may be hinged to the top panel for swing-out movement.

Referring again to FIG. 1, in the closed configuration of the primary body member, the lower edges of the side panels 48 and 50 rest on and are releasably secured to the bearing surfaces 38 and 37 of the quarter panel structures while the leading edges of the side panels sealingly engage respective ones of the rear body pillars. Similarly, the header portion 44 of the top panel sealingly engages the roof structure 22, the result being a composite vehicle body having a station wagon type appearance. To convert from the closed to the open configuration of the primary body member the secondary body member 14 is removed therefrom, the primary body member then assuming the appearance of a pick-up truck type vehicle body with the doors 18 and 20, the roof structure 22, and the supporting body pillars defining a cab portion which is forward of and which has one side adjoining the cargo compartment, the adjoining side being open so that passage through the plane thereof is unobstructed.

As seen best in FIG. 1, a front seat structure 52 is conventionally adjustably mounted on the floor panel 39 between the doors 18 and 20 and below the fixed roof structure 22. A rear seat structure designated generally 54 is supported on the floor panel 39 behind the front seat structure in a manner to the described hereinafter and is adapted for conversion between a passenger carrying operational mode in the closed configuration of the primary body member and a bulkhead forming operational mode in the open configuration of the primary body member.

Figure 2:
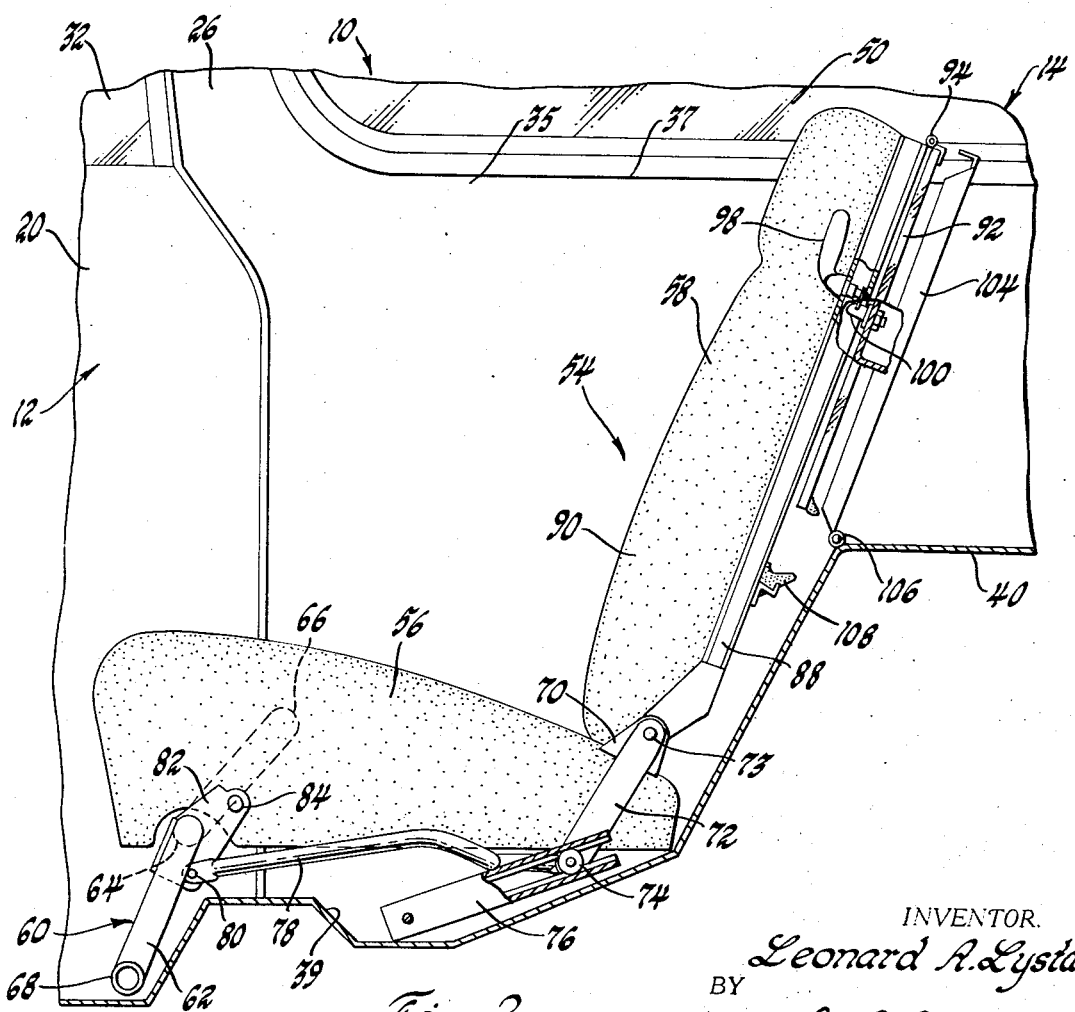
FIG. 2 is an enlarged partially broken away view of a portion of FIG. 1 showing the rear seat structure in the position thereof corresponding to the closed configuration of the vehicle body.

Referring now to FIGS. 2 and 3, the rear seat structure 54 includes a cushion base member 56 and a cushion back member 58. The base member 56 is supported on the primary body member 12 for translation fore and aft between a normal position, shown in FIG. 2 and in solid lines in FIG. 1, and a stowed position, shown in FIG. 3 and in broken lines in FIG. 1, by a linkage arrangement which is symmetrical with respect to the longitudinal centerline of the vehicle. Accordingly, for purposes of clarity, only the left side of the linkage arrangement will be described hereinafter. The linkage arrangement includes a generally inverted U-shaped front support bar 60 having a left vertical side 62 and a laterally extending side 64, the latter side having an arch 66 therein overlying the conventional drive shaft tunnel of the vehicle body. A trunnion 68 at the lower end of vertical side 62 is rotatably supported on the floor panel 39 by conventional bearing means, not shown, so that the front support bar is pivotable about a transverse axis of the primary body member.

The linkage arrangement further includes a bracket 70 rigidly attached to the base member 56 adjacent the rear lateral edge thereof, the bracket having a support link 72 mounted thereon at 73 for pivotal movement about a first fixed axis of the base member. The support link 72 rotatably supports at its distal end a roller follower 74 which follower is guidingly received in a cam channel segment 76 rigidly affixed to the left quarter panel structure 34. A longitudinally extending connecting link 78 is attached at one end to the support link 72 for pivotal movement about the axis of rotation of the roller follower 74 and at the other end is pivotally attached at 80 to a gusset plate 82, the gusset plate being rigidly attached to the support bar 60 slightly inboard of the vertical side 62. The gusset plate 82 extends above the lateral side 64 of the support bar and is connected to the left side of the base member 56 at 84 for pivotal movement relative to the latter about a second fixed axis thereof.

Referring particularly to FIG. 2, in the normal position of the base member 56 the support bar 60 and the support link 72 are inclined rearwardly so that the base member exhibits a natural tendency to remain in the normal position resting on appropriate fixed stops, not shown. By applying to the base member 56 a forwardly directed force, the support bar 60 is caused to rotate counterclockwise from the position of FIG. 2 to the position of FIG. 3 during which rotation the connecting link 78 pulls the roller follower 74 and corresponding end of the support link 72 forwardly in a path defined by the cam channel 76. Since the distance between the first and second fixed transverse axes of the base member remains constant, the rear support link is constrained to simultaneously pivot counterclockwise from the position shown in FIG. 2 to the position shown in FIG. 3, the base member thus being lifted slightly and translated forwardly from the normal to the stowed position. In the stowed position of the base member 56, FIG. 3, the front support bar 60 and support link 72 are inclined forwardly so that the base member exhibits a natural tendency to remain in the extended position resting on appropriate stops, not shown.

Referring to FIGS. 2 and 3, the back member 58 of the rear seat structure 54 includes a generally flat and rigid frame 88 having a resilient cushion 90 covering the front surface thereof. The frame 88 is supported on the bracket 70 and on the corresponding opposite side bracket, not shown, for pivotal movement relative to the base member about the first fixed axis of the latter between a rearwardly inclined retracted position, shown in FIG. 2 and in solid lines in FIG. 1, and a forwardly inclined extended position, shown in FIG. 3 and in broken lines in FIG. 1. A partition 92, preferably transparent, of width generally equal to the width of the back member 58 is supported on the frame 88 at 94 for pivotal movement relative to the latter about a transversely extending axis of the back member 58 between a lowered position, FIG. 2, in parallel and juxtaposed relation to the rear surface of the frame 88 and a raised position, FIG. 3, above and in generally coplanar relation to frame 88.

The vertical sides of frame 88 are shaped to generally closely conform to the shape of the lower portion of the open adjoining side of the cab, the adjoining side being situated in the lateral plane containing the rear body pillars. Similarly, the vertical sides of the partition 92 are shaped to generally closely conform to the configuration of the upper portion of the open adjoining side of the cab. Conventional seal means, not shown, are provided on the quarter panel structure in the plane of the adjoining side of the cab and engage corresponding seal means, not shown, on the frame 88 of the back member 58 in the extended position of the latter when the base member is in the stowed position to form a weather-tight seal between the frame 88 and the primary body member. Conventional seal means 96, FIG. 3, affixed to the rear pillars and across the rear margin 23 of the roof structure, sealingly receive the partition 92 in the raised position thereof when the back member and base member are in the extended and stowed positions, respectively. Accordingly, when the frame 88 is in the extended position and the partition 92 is in the raised position, a weather sealed rear bulkhead is formed which closes the heretofore open adjoining side of the cab.

As seen best in FIGS. 2 and 3, a latch handle 98 is rotatably supported on the frame 88 adjacent one of the vertical sides thereof. The latch 98 is adapted to retainingly engage a first keeper 100 on the primary body member in the retracted position of the back member and the normal position of the base member to maintain the back in the retracted position. Similarly, the latch 98 is adapted to retainingly engage a second keeper 102 on the primary body member in the stowed position of the base member and the extended position of the back member to maintain the latter in the extended position. It will, of course, be apparent that any number of such latch and keeper combinations might be provided to achieve any degree of retention desired.

As seen best in FIGS. 2 and 3, a rigid filler plate 104 is supported at 106 on the primary body member generally adjacent the forward edge of the cargo floor 40 for pivotal movement about a transverse axis between a folded position, FIG. 2, and an unfolded position, FIG. 3. In the folded position, the filler plate 104 defines a rigid wall at the forward end of the cargo floor adapted to protectively receive, the partition 92 in the lowered position thereof when the back member and base member are in the retracted and the normal positions, respectively. Conventional latch means, not shown, maintain the filler plate in the folded position. When the back member and the base member assume the extended and the stowed positions, respectively, space becomes available for pivotal movement of the filler plate from the folded to the unfolded position wherein the latter extends in coplanar relation to the cargo floor 40 from the leading edge thereof to the frame 88, the plate thus filling the space vacated by the back member and providing continuity for the cargo floor. The forward edge of the filler plate is supported in the unfolded position by a combination support and edge seal 108 affixed to the frame 88. Other seals, not shown, are provided as necessary between the filler plate and the quarter panel structures to effect weather-tight sealing between the filler plate, in the unfolded position thereof, and the primary body member.

Ordinarily, the primary body member is operated in the closed configuration with the secondary body member 14 sealingly supported thereon and the base member 56 and back member 58 of the rear seat structure in the normal and the retracted positions, respectively. Accordingly, the vehicle body functions in a conventional station wagon mode adapted to carry cargo on the covered cargo floor 40 and passengers on the front and rear seat structures, access to the latter being had in a conventional manner through the plane of the open adjoining side of the cab. The filler plate 104, being in the folded position thereof, protectively covers the partition 92 for preventing damage to the latter by cargo on the floor 40. When abnormally large or bulky cargo is to be transported, the primary body member is easily converted from the closed configuration to the open configuration by first removing the secondary body member 14. Thereafter the latch 98 is actuated to release keeper 100 and the base member 56 is translated from the normal to the stowed position thereof while the back member 58 and partition 92 are concurrently moved from the retracted and the lowered positions to the extended and the raised positions, respectively. Finally, the filler plate is pivoted from the folded to the unfolded position. The result, then, is a vehicle body resembling a typical pick-up truck wherein the passenger cab is sealingly separated from the open cargo compartment by a bulkhead formed by the back member 58 and the partition 92. When it is desired to reconvert the primary body member from the open to the closed configuration the steps recited thereinbefore are merely reversed.

Having thus described the invention, what is claimed is:

1. In a vehicle, the combination comprising, a primary body member having an open truck type configuration and including an open cargo compartment and a cab forward of said cargo compartment with a side of said cab adjoining said compartment, said adjoining side being open so that passage through the plane thereof is unobstructed, a secondary body member adapted for removable installation on said primary body member over said compartment thereby to alter the configuration of said primary body member from said open truck type configuration to that of a closed station wagon type vehicle body, a front seat structure mounted on said primary body member in said cab, and a rear seat structure adapted to accommodate passengers in said closed configuration of said primary body member and to sealingly close said adjoining side in said open configuration of said primary body member, said rear seat structure including a cushion base member supported on said primary body member rearward of said front seat structure, a cushion back member, means supporting said back member on said primary body member for movement between a retracted position cooperating with said base member in comfortably supporting passengers and an extended position closing the lower portion of said adjoining side, a partition, means supporting said partition on said back member for movement between a raised position and a lowered position, said partition in the raised position thereof and in the extended position of said back member closing the upper portion of said adjoining side, and seal means adapted to effect sealing engagement between said primary body member and said back member in the extended position thereof and between said primary body member and said partition in the raised position thereof when said back member is in the extended position.

2. In a vehicle, the combination comprising, a primary body member having an open truck type configuration and including a cargo compartment and a cab forward of said cargo compartment with a side of said cab adjoining said compartment, said adjoining side being open so that passage through the plane thereof is unobstructed and said cargo compartment including a floor with a forward edge spaced rearwardly from said adjoining side, a secondary body member adapted for removable installation on said primary body member over said cargo compartment thereby to alter the configuration of said primary body member from said open truck type configuration to that of a closed station wagon type vehicle body, a front seat structure mounted on said primary body member in said cab, a cushion base member, means supporting said base member on said primary body member rearward of said front seat structure, a cushion back member, means supporting said back member on said primary body member for movement between a retracted position adjacent said forward edge of said floor cooperating with said base member in comfortably supporting passengers and an extended position closing the lower portion of said adjoining side, a partition, means supporting said partition on said back member for movement between a raised position and a lowered position, said partition closing the upper portion of said adjoining side in the raised position thereof and in the extended position of said back member, seal means adapted to effect sealing engagement between said primary body member and said back member in the extended position thereof and between said primary body member and said partition in the raised position thereof when said back member is in the extended position, a filler plate, and means supporting said filler plate on said primary body member for movement between a folded position in the retracted position of said back member and an unfolded position in the extended position of said back member defining a coplanar extension of said floor between said forward edge thereof and said back member.

3. In a vehicle, the combination comprising, a primary body member having an open truck type configuration and including an open cargo compartment and a cab forward of said cargo compartment with a side of said cab adjoining said compartment, said adjoining side being open so that passage through the plane thereof is unobstructed, a secondary body member adapted for removable installation on said primary body member over said compartment thereby to alter the configuration of said primary body member from said open truck type configuration to that of a closed station wagon type vehicle body, a front seat structure mounted on said primary body member in said cab, and a rear seat structure adapted to accommodate passengers in said closed configuration of said primary body member and to sealingly close said adjoining side in said open configuration of said primary body member, said rear seat structure including a cushion base member, a cushion back member, means supporting said back member on said base member for pivotal movement between a retracted position and an extended position, means supporting said base member on said primary body member for fore and aft bodily movement between a normal position and a stowed position, said back member in the retracted position thereof and in the normal position of said base member cooperating with the latter in comfortably supporting passengers and said back member closing the lower portion of said adjoining side in the extended position thereof and in the stowed position of said base member, a partition, means supporting said partition on said back member for pivotal movement between a raised position and a lowered position, said partition closing the upper portion of said adjoining side in the raised position thereof and in the extended and the stowed positions respectively of said back member and said base member, and seal means adapted to effect sealing engagement between said primary body member and said back member in the extended position of the latter and in the stowed position of said base member and between said primary body member and said partition in the raised position of the latter when said back member and said base member are in the extended and the stowed positions respectively.

4. In a vehicle, the combination comprising, a primary body member having an open truck type configuration and including a cargo compartment and a cab forward of said compartment with a side of said cab adjoining said compartment, said adjoining side being open so that passage through the plane thereof is unobstructed and said compartment including a cargo floor with a forward edge spaced rearwardly from said adjoining side, a secondary body member adapted for removable installation on said primary body member over said compartment thereby to alter the configuration of said primary body member from said open truck type configuration to that of a closed station wagon type vehicle body, a front seat structure mounted on said primary body member in said cab, a cushion base member, a cushion back member, means supporting said back member on said base member for pivotal movement between a retracted position and an extended position, means supporting said base member on said primary body member for fore and aft bodily movement between a normal position and a stowed position, said back member in the retracted position thereof and in the normal position of said base member being situated adjacent said forward edge of said floor and cooperating with said base member in comfortably supporting passengers and said back member closing the lower portion of said adjoining side in the extended position thereof and in the stowed position of said base member, latch means on said back member and on said primary body member adapted to releasably secure said back member in either one of the extended and the retracted positions thereof when said base member is in the stowed and the normal positions thereof respectively, a partition, means supporting said partition on said back member for pivotal movement between a raised position and a lowered position, said partition closing the upper portion of said adjoining side in the raised position thereof when said back member and said base member are in the extended and the stowed positions respectively, seal means adapted to effect sealing engagement between said primary body member and said back member in the extended position thereof when said base member is in the stowed position and between said primary body member and said partition in the raised position thereof when said back member and said base member are in the extended and the stowed positions respectively, a filler plate, and means supporting said filler plate on said primary body member adjacent said forward edge of said floor for pivotal movement between a folded position protectively enclosing said partition in the lowered position thereof when said back member and said base member are in the retracted and the normal positions respectively and an unfolded position defining a coplanar extension of said floor from said forward edge to said back member when said back member and said base member are in the extended and the stowed positions respectively.

* * * * *